United States Patent [19]
Kleveland

[11] 3,890,214
[45] June 17, 1975

[54] METHOD AND APPARATUS FOR MECHANIZED SMUTTING OF ELECTROLYZERS

[75] Inventor: Sigbjorn Kleveland, Voyenenga, Norway

[73] Assignee: Norsk Hydro A.S., Oslo, Norway

[22] Filed: Feb. 26, 1974

[21] Appl. No.: 446,111

[30] Foreign Application Priority Data
Mar. 1, 1973  Norway................................. 825/73

[52] U.S. Cl................................. 204/70; 204/245
[51] Int. Cl. ......................... C22d 3/08; C22d 3/02
[58] Field of Search ............... 209/211; 204/70, 245

[56] References Cited
UNITED STATES PATENTS
2,514,283  7/1950  Lawson et al...................... 204/245
3,019,901  2/1962  Woodruff............................ 209/211

FOREIGN PATENTS OR APPLICATIONS
254,104  1/1970  U.S.S.R............................. 204/245

Primary Examiner—John H. Mack
Assistant Examiner—D. R. Valentine
Attorney, Agent, or Firm—Wenderoth, Lind & Ponack

[57] ABSTRACT

Method for the removal of sludge from electrolyzers, especially electrolyzers for the fused salt electrolysis of magnesium, where a mixture of melted electrolyte and sludge by means of a suction pipe immersed into the electrolysis bath, by suction is brought up into a collecting tank, which is connected to a vacuum source. The mixture of sludge and melted electrolyte is led into the tank, by settling the sludge is separated from the melt and after the vacuum is neutralized, the melt is led back into the bath of the electrolytic cell through the same suction pipe, while the sludge continuously is separated from the mixture and freely sinks down to the bottom of the tank.

5 Claims, 2 Drawing Figures

PATENTED JUN 17 1975  3,890,214

METHOD AND APPARATUS FOR MECHANIZED SMUTTING OF ELECTROLYZERS

BACKGROUND OF THE INVENTION

This invention concerns a method for mechanized smutting of electrolyzers, which method is especially adapted for removing sludge from electrolyzers utilised in the fused salt production of magnesium metal. The formation of sludge has represented a serious problem in connection with the electrolytic production of magnesium metal. If the accumulated sludge is not removed, the sludge may create difficulties for performing an effective electrolysing process. The sludge which is formed, consists predominantly of magnesium oxide of different particle sizes, and in addition some other contaminations in the form of $SiO_2$-, $Fe_2O_3$- and $Al_2O_3$- particles etc., as well as extranous matter formed by corrosion and erosion of the material in the walls of the cells, the electrodes and so on.

Lately there have been several attempts to develop apparatus and methods for performing mechanized smutting of magnesium electrolyzers during prevailing working conditions. One of the best known means is built up around the so called vacuum ladle, and is described in the USSR-patent No. 138,751. The apparatus consists of a metal container with a lower, conical bottom part. A suction pipe is connected to the metal container, and this pipe is further provided with a horizontal suction nozzle which is moveable horizontally and which can be lifted with the help of a system of levers. During operation the vacuum ladle is connected to a source of vacuum, and there is sucked up a mixture of sludge and electrolyte which is collected in the container, while the suction nozzle all the time is moved forward and backward in an arcuate path at the bottom of the electrolyzer. When the collecting container is full, the mixture of electrolyte and sludge is taken away for further settling, or the mixture is cooled, whereafter it is ground and employed as a fertilizer.

This known apparatus is employed with an apparently good result for the smutting of electrolyzers which are fed with carnallite. In this case it is necessary to extract relatively great amounts of electrolyte from the cell to maintain the desired proportion of the components present in the melt. At the same time the sludge is removed. The operation is performed relatively often, and the amount of sludge which is generated between each operation is relatively small. The suction is therefore easy to perform.

When there is employed other types of starting material, for example magnesium chloride produced by shaft furnace chlorinating of MgO, or by the evaporation of magnesium chloride brine, the need to remove surplus electrolyte is substantially less. When the cells of the electrolyzers are running for a long time without being smutted, there will therefore be formed very dense and compact layers of sludge at the bottom of the cells, which layers in practice are not easily removed by the suction action provided by the known vacuum ladle. Either there is sucked up mainly electrolyte melt containing only small amounts of sludge, or the dense, compact sludge consisting of particles of relatively great size blocks the suction nozzle and does now allow an effective smutting. The known apparatus for mechanized smutting are thus not suited for all kinds of raw materials.

There are further known a series of other apparatus for mechanized smutting, which theoretically should take care also of dense, compact sludge with relatively great particle size. Thus is has been proposed to employ a centrifugal pump, means in the form of a rotating screw conveyor, and further a scooping means which lifts or hoistes the sludge out of the electrolyzer cell. These means are, however, mechanically complicated and are made of moveable parts and complex components which are not resistant under the influence of the high working temperatures and the very corrosive conditions prevailing in the cell. Such apparatus have therefore up to now not been a practical success.

Due to these facts one has up to now to a great extent been forced to perform manual smutting of the electrolytic cells with the drawbacks and costs which are related to such manual smutting. Manual smutting is very hard to perform and is also work intensive. If this operation is mechanized the work will be easier to perform and the operator will not be as exposed to heat. The number of operators may be extensively reduced, this also giving a reduction in the costs. During manual smutting some metal will also be lost in the sludge, and investigations which are made indicate that this loss can be drastically reduced if the smutting process is mechanized.

SUMMARY OF THE INVENTION

The invention is described in a connection with the removal of sludge from an electrolyzer for production of magnesium, but it is not limited to the utilization only in connection with cells of this type. The apparatus according to the invention is in the form of a self supporting, constructional unity, and the method as well as the apparatus is applicable for the mechanized removal of sludge generated by the fused salt electrolyzes of metals, where similar sludge problems are encountered, for example by the electrolytic production of alumium from aluminium chloride.

According to the present invention there is provided a method for mechanized smutting which permits the smutting of electrolyte baths where the sludge exists in the form of dense, hard sedimentations.

Further the invention comprises a method where the mechanized smutting can be performed without substantial spending or waste of electrolyte, which makes possible a more economic handling than by the earilier known methods. All these advantages are obtained while the conventional advantages accompanying the mechanization of the smutting process are retained.

The invention thus concerns a method for the mechanized removal of sludge from electrolyzer cells, especially cells for the fused salt electrolysis of magnesium, where a mixture of electrolyte and sludge, with the help of a suction pipe which is submerged into the electrolyte bath, is sucked or drawn up into a collecting tank which is under reduced pressure, and the method is especially characterized in that the mixture of sludge and melted electrolyte from the suction pipe is led into the collecting tank in such a way that the sludge is removed from the melted electrolyte by settling, and that the melted electrolyte, after the vacuum is released, is led back into the electrolysis bath through the suction pipe, while the sludge continuously is precipitated and freely sinks down to the bottom part of the tank.

In this connection it shall be pointed out that the return of the melted electrolyte through the same pipe, through which the suction is performed, is a very important feature of the method according to the invention. The return of the electrolyte melt through the suction pipe contributes to clean the pipe and especially the suction nozzle for particles and impurities which may be precipitated, and which might lead to clogging or blocking of the system. At the same time the stream of melted electrolyte which is led into the bath against the top surface of the sludge has a certain mechanical stirring effect, which is responsible for holding some sludge suspended in the melt, so that this will be led through the suction nozzle when the suction sequence is started. In this way most of the precipitated sludge will gradually be brought into suspension and removed by suction.

It is surprising that it is possible to obtain a satisfactory separation of melted electrolyte ane particles of sludge during the short interval in the collecting tank. Even more surprising is that the slow flow through the suction pipe, after the vacuum is turned off, is satisfactory to clean up the suction pipe as well as the suction nozzle and to bring the compact layer of sludge into suspension.

The invention further concerns an apparatus for carrying out the above method. The apparatus consists of a collecting tank which can be placed under vacuum, which tank is connected to a suction pipe with a suction nozzle provided in the end, and the apparatus is characterized in that the suction pipe is connected to the tank at a distance from the bottom of the tank as well as from the top of the tank, whereby the tank is divided into two main compartments, one lower compartment for gathering of sludge and one upper compartment for gathering of clean electrolyte.

BRIEF DESCRIPTION OF THE DRAWINGS

Other advantages and features of the invention will be apparent from the following description in connection with the accompanying drawings, which show a preferred form of apparatus for carrying out the method of the present invention.

DETAILED DESCRIPTION OF THE INVENTION

Figure 1:
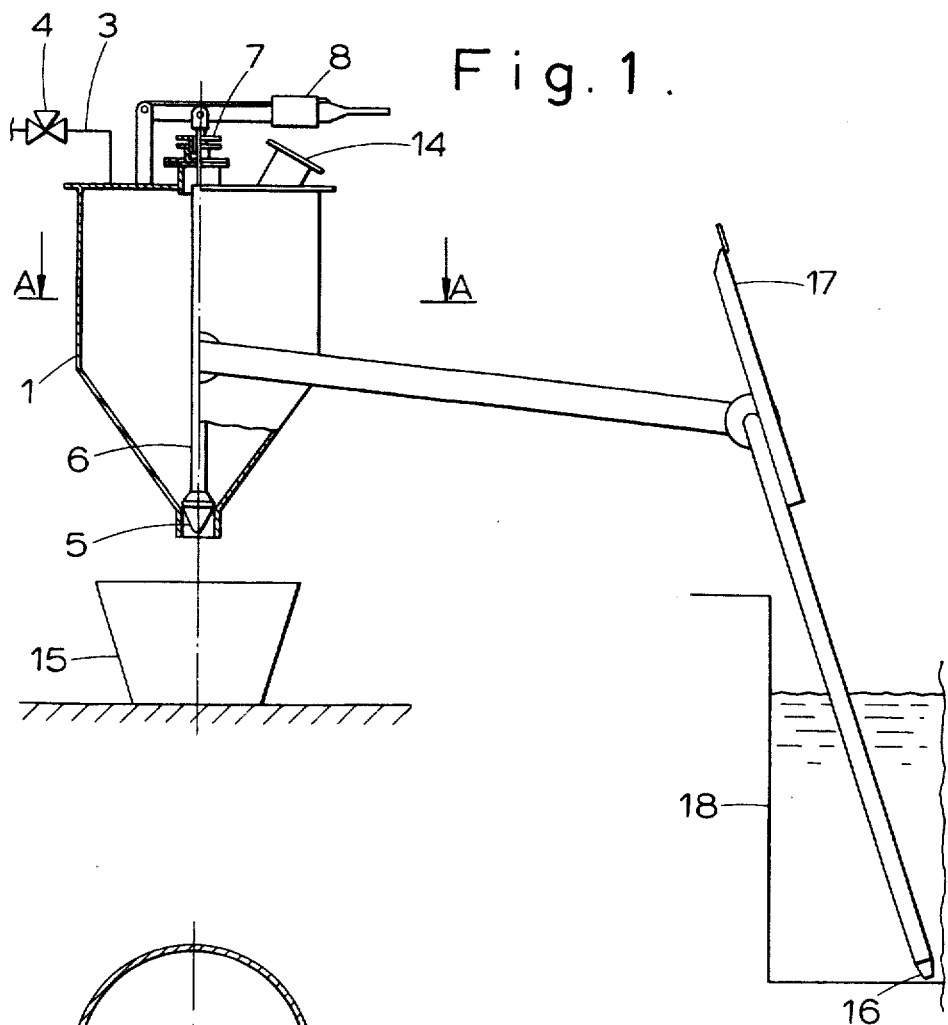
FIG. 1 shows a view of the apparatus in elevation with one half of the tank shown in section.
Figure 2:
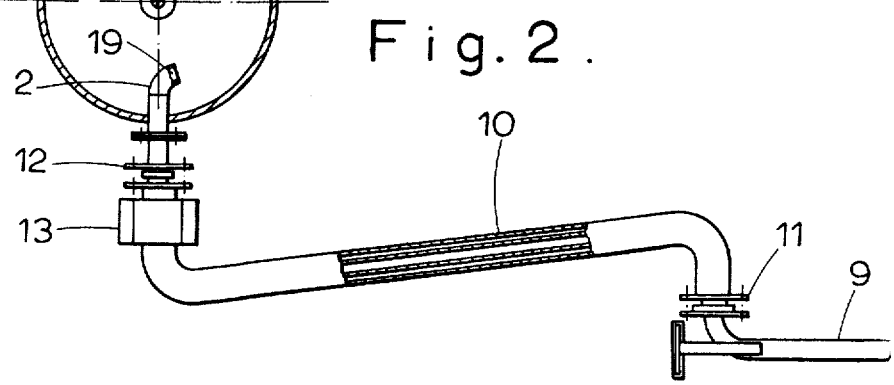
FIG. 2 shows a ground view of the apparatus with the tank shown in section just above the inlet for the suction pipe.

The suction tank 1 is cylindrical and has a conical bottom compartment. The tank is connected to a vacuum source via the pipe 3 and a three way valve 4.

The bottom of the tank is provided with a valve 5 which by the means of a rod 6 is led through a stuffing box 7 connected to lever 8 for operating the valve. On the top of the tank is provided an inspection cover 14 with a heat proof glass.

Underneath the tank is situated an open container 15 for collecting the sludge which has been precipitated.

The suction pipe 9–10 is connected to an inlet pipe 2 which is led through the side wall of the tank. The pipe 2 leads the flow of melted electrolyte tangentially into the tank. The opening of the pipe is situated at a distance from the top of the tank and from the side of the tank.

The suction pipe is in the form of a single pipe 9 and a double walled pipe 10. The pipes are connected together by the help of moveable connections 11 and 12.

The handle 17 is employed to move the suction nozzle 16 along the bottom of the electrolytic cell bath 18. The suction pipe is journalled in a bearing 13.

The tank with associated equipment can be transported on a wagon from one cell to another, instead of being hoisted by a crane as described in the above mentioned Russian patent. In connection with the inlet pipe 2 there may be provided a disc or a plate 19 which at its upper part is hinged to and which covers a certain percentage of the open section of the pipe. The disc may be circular with a diameter which is less than the internal diameter of the pipe. When the mixture of sludge and melted electrolyte is drawn into the tank, the disc is pushed away, whereby the full section through the opening of the pipe is established, while the section is reduced again when the melt is flowing back.

The melted electrolyte will therefore be given a prolonged stay in the tank and the separation effect may be correspondingly improved.

With the help of the arrangement in connection with the bottom valve 5 and with the sludge contaner 15 underneath the tank, there is provided an effective constructional layout, at the same time as a short period between each dumping of sludge, thus preventing freezing and growing of sludge on the walls of the container.

The special jointed and moveable connections of the suction pipe insure that the suction nozzle can at all times be moved along the bottom of the electrolytic cell. The two links or connections of the suction pipe must be tight fitting and easy to move, at the same time as they have to resist the temperature (700°–800°C) of the elctrolytic melt. The detailed construction of pipes, connections and bearings is not shown on the drawings.

When the tank is opened to the vacuum source by means of the valve 4 and there is drawn a mixture of sludge and melted electrolyte through the suction pipe, the tangential introduction into the tank puts the mixture into rotation. The mixture is still rotating when the pressure in the tank is neutralized and the melted electrolyte flows back to the bath through the suction pipe. The sludge which is slightly more heavy than the melt, will be pressed out against the walls of the collecting tank and sinks along the walls towards the bottom of the tank. Further the stream of melted electrolyte is deflected 180°C when it, after the closing of the suction sequence, is led into the suction pipe and back to the cell. This assists in an effective separation of the sludge. During the whole of the above described period the settling of the sludge is going on with particles of sludge sinking down to the bottom along the walls of the tank.

Below will be given a practical example for performing the sludging operation:

Before the sludging can take place the tank 1 has to be preheated. The bottom valve 5 and the inspection cover 14 are opened and a gas burner (propane) is placed under the bottom valve.

The smutting apparatus is then driven forward to the bath which is going to be smutted, and the vacuum is connected from a vacuum source to the threeway valve 4 by means of a vacuum hose. Under the tank is provided a container 15 for sludge.

Thereafer the suction pipe is put into the electrolysis bath such that the suction nozzle is brought under the surface of the metal, but above the surface of the sludge. The bottom valve is then closed and vacuum connected to the tank. When the stream of melted electrolyte is well established and the suction pipe is warm all through, the suction nozzle is brought down into the sludge. The nozzle is moved from one side to the other side of the bath, while it simultaneously all the time is moved in the vertical direction from the top of the layer of sludge and down to the bottom of the bath. When the tank is full the vacuum is closed and the pressure neutralized by the help of the threeway valve 4.

To avoid excess filling, the level in the tank is controlled visually during the whole period of suction through the fireproof glass in the inspection cover 14.

Melted electrolyte in the upper compartment of the tank, which is above the level where the suction pipe is introduced, will thereafter flow back to the bath through the suction pipe 2, 10, 9. The above mentioned cycle is then repeated until the layer of sludge in the tank approaches the level of the inlet pipe 2. For the apparatus described above, the number of cycles will usually vary between three and ten.

When the required amount of sludge by suction is brought into the tank and settles in the lower compartment, the bottom valve 5 is opened and the sludge is led into the sludge container 15.

What is claimed is:

1. In a method for the removal of sludge from electrolyzers, particularly electrolyzers for the fused salt electrolysis of magnesium, wherein a mixture of melted electrolyte and sludge, by means of a suction pipe immersed in an electrolysis bath, is transferred by suction from the bath into a collecting tank which is connected to a vacuum source, the improvement wherein said method comprises:

passing the mixture of sludge and melted electrolyte through the suction pipe into the tank;
   separating the sludge by settling from the melt;
   neutralizing the vacuum in said tank; and
   passing the melt, after the vacuum is neutralized, back into the bath of the electrolytic cell through said suction pipe, while continuously separating the sludge from the mixture and allowing the sludge to freely sink down to the bottom of the tank.

2. A method as claimed in claim 1, wherein said mixture is passed into said tank by leading the mixture tangentially into the tank at a position spaced from the walls of the tank, thus imparting a rotating movement to the mixture inside the tank, and thereby performing centrifugal separation of said sludge from said melted electrolyte.

3. An apparatus for the removal of sludge from electrolyzers, particularly electrolyzers for the fused salt electrolysis of magnesium, said apparatus comprising:

a collecting tank with a valve at the bottom thereof;
   connecting means for connecting said tank to a vacuum source;
   a suction pipe having at a first end thereof a suction nozzle;
   a combined inlet and discharge pipe connected to a second end of said suction pipe and extending into said tank;
   said inlet and discharge pipe having an end opening means spaced from the bottom, top and interior surface of the wall of said tank for selectively directing a mixture of sludge and melted electrolyte into said tank tangentially to said wall thereof;
   said opening means dividing said collecting tank between a first lower compartment means for collecting sludge separated from said mixture, and a second upper compartment means for collecting melted electrolyte separated from said mixture; and
   said combined inlet and discharge pipe comprising means selectively operable for discharging the thus separated electrolyte into said suction pipe.

4. An apparatus as claimed in claim 3, further comprising a disc hingedly connected to said opening means and partially covering said opening means.

5. An apparatus as claimed in claim 3, wherein said suction pipe comprises two main parts, a first part in the form of a single pipe which is connected to said suction nozzle, and a second part in the form of a double walled pipe, said first and second main parts being rotatably connected by means of a first moveable connection, and said double walled pipe being connected to said inlet and discharge pipe by means of a second moveable connection.

* * * * *